M. D. WELLS.
Seed Dropper.

No. 13,893.

Patented Dec. 4, 1855.

UNITED STATES PATENT OFFICE.

MOSES D. WELLS, OF MORGANTOWN, VIRGINIA.

IMPROVEMENT IN HAND SEED-SOWERS.

Specification forming part of Letters Patent No. 13,893, dated December 4, 1855.

*To all whom it may concern:*

Be it known that I, MOSES D. WELLS, of Morgantown, in the county of Monongalia and State of Virginia, have invented a new and useful Improvement in Seed-Sowers; and I do hereby declare that the following is a full, clear, and exact description of the construction and operation of the same, reference being had to the annexed drawings, forming part of this specification, in which—

Figure 1:
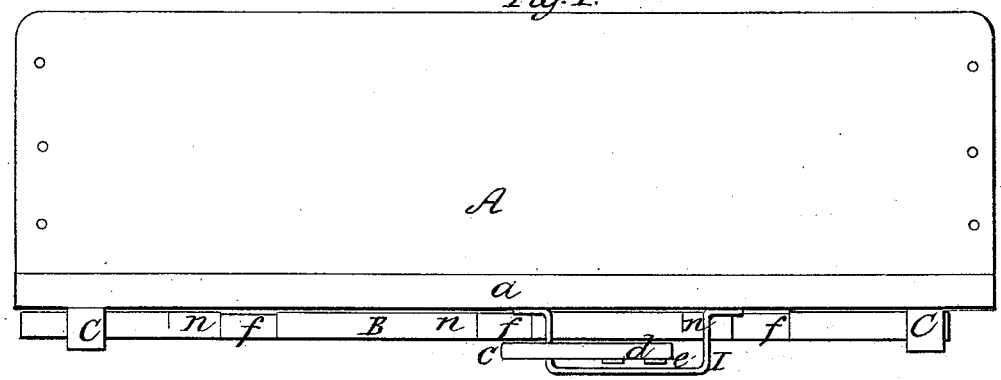
Figure 2:
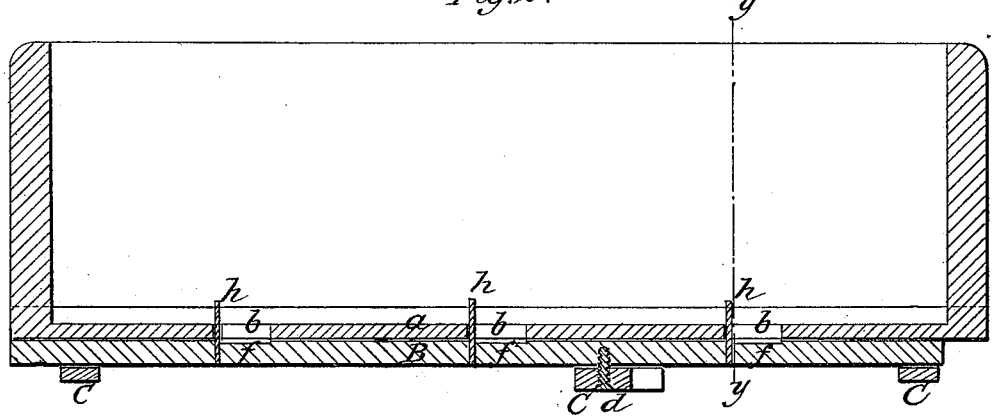
Figure 3:
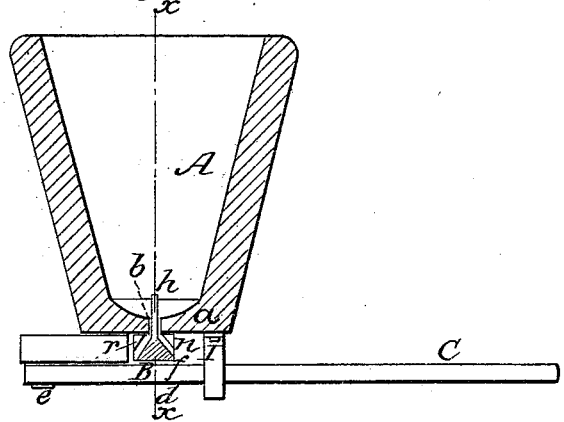
Figure 4:
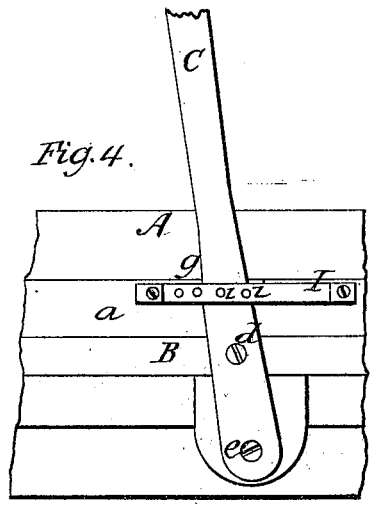

Figure 1 is a side view of the seed-sower. Fig. 2 is a longitudinal section on line $x\ x$ of Fig. 3. Fig. 3 is a vertical transverse section on line $y\ y$ of Fig. 2. Fig. 4 is a view of bottom, showing lever-stop.

Similar characters of reference in the several figures denote the same part of the machine.

The invention here considered refers to the manner of discharging the seed and to the regulation of the quantity discharged. It lies in constructing the agitator and regulator of a flat bar having at intervals corresponding with slotted openings in the bottom of the hopper the cross-section of a double inclined plane with the ridge slightly below the upper surface of the bar, this bar being reciprocated in guides beneath and in contact with the bottom of the hopper, so as to close the slots when the double inclined planes are from under them and open such portion thereof for the discharge of seed as the inclined planes pass under, the interior of the hopper-bottom being concave, and the agitator provided with pins passing through the slots for insuring the discharge of the seed.

The details of construction and operation will be understood from the following description and reference to the drawings, in which the several parts are thus represented.

A is a hopper, having a concave bottom, $a$, slotted, as seen at $b\ b$, the number of slots of course depending on the length of hopper; B, regulator and agitator, movable longitudinally in guides $c$ by vibration of lever C, connected with hopper-bottom and sliding bar B at $d$ and $e$. This bar is cut at intervals, regulated by the number and position of slots $b$, into double inclined planes $f$, whose ridges are slightly below the upper surface of the bar, as shown in Figs. 2 and 3. At the left-hand extremity of each double inclined plane arises a pin, $h$, passing through the slot above, these pins serving to stir the seed and limit the movement of the bar B when the entire discharge capacity of the slots is made use of. If, however, it be desired to limit the discharge of seed, then the bar B is not permitted to move far enough to carry the entire inclined plane under the slot, the lever C being stopped by a pin, $g$, in one of the holes $i$ of strap I. This permits the discharge of seed from the open portion of the slot, while a portion remains closed by bar B. The bar is slightly cut away on the left of the pins $h$ to allow the bar to free itself from any seed that might work between it and the bottom of the hopper. These cuts are shown at $n$ in the drawings. The employment of the word "left," as above, is intended as a mere reference to the drawings, and is not designed to fix the position of the parts referred to so as to indicate the impossibility of a reverse position.

The operation of the sower is as follows: The pin $g$ is inserted in the hole $i$ of strap I, which will give the lever C the requisite movement for the quantity of seed to be discharged. The reciprocation of this lever within the limits allowed effects the discharge. When the double inclined planes are carried altogether from under the slots the operation ceases. The concave bottom and stirring-pins $h$ prevent any clogging during the sowing operation.

This machine is particularly adapted to the sowing of small seed.

I claim as new and of my own invention—

Effecting the seed-discharge and regulating the amount of the same by means of the double inclined planes $f$ of bar B, reciprocating without the hopper, the adjustments and operation being substantially as herein specified.

In testimony whereof I have hereunto signed my name before two subscribing witnesses.

MOSES D. WELLS.

Witnesses:
 GEO. PATTEN,
 JOHN S. HOLLINGSHEAD.